United States Patent [19]
Boll et al.

[11] Patent Number: 6,099,922
[45] Date of Patent: Aug. 8, 2000

[54] THERMALLY INSULATED METAL SURFACE PROTECTED AGAINST METAL DUSTING CORROSION

[75] Inventors: Walter Boll, Frankfurt am Main; Friedrich Hohmann, Langen; Werner Roell, Wächtersbach, all of Germany

[73] Assignee: Metallgesellschaft Aktiengesellschaft, Frankfurt am Main, Germany

[21] Appl. No.: 08/814,651

[22] Filed: Mar. 3, 1997

[30] Foreign Application Priority Data

Apr. 6, 1996 [DE] Germany .......................... 196 13 905

[51] Int. Cl.[7] .............................. A47G 19/22; F28D 7/00; C07C 5/05; B01J 8/02
[52] U.S. Cl. ...................... 428/34.4; 428/34.6; 422/197; 422/201; 585/273; 585/274; 585/950; 585/921; 423/213.5; 423/239.1
[58] Field of Search ..................................... 422/197, 198, 422/200, 201, 202; 585/273, 274, 950, 921; 428/34.4, 34.6; 423/213.5, 212, 239.1

[56] References Cited

U.S. PATENT DOCUMENTS

| 3,527,288 | 9/1970 | Guthrie ........................................ 165/1 |
| 3,804,163 | 4/1974 | Bradley et al. ............................ 166/59 |
| 5,565,009 | 10/1996 | Ruhl et al. ................................... 48/97 |

FOREIGN PATENT DOCUMENTS

| 43 27 176 | 1/1995 | Germany . |
| 1178559 | 1/1970 | United Kingdom . |

OTHER PUBLICATIONS

Hydrocarbon Processing, Aug. 1972, Houston US pp. 73–75, R.C. Schueler "Metal Dusting".

Chemical Engineering, Jan. 6, 1986, New York, US, pp. 83–87, XP002017649, C.M. Schillmoller, "Solving High–Temperature Problems in Oil Refineries and Petrochemical Plants".

*Primary Examiner*—Ellis Robinson
*Assistant Examiner*—Jennifer M. Hayes
*Attorney, Agent, or Firm*—Herbert Dubno

[57] ABSTRACT

The metal surface protected against metal-dusting corrosion has an insulating layer of a gas-permeable, thermally insulating material. The side of the thermal insulating layer that is colder during operation is in direct vicinity of the metal surface, and the side of the insulating layer that is hotter during operation is heated by a gas stream containing carbon monoxide, which in addition contains hydrogen and/or steam and has a temperature in the range from 300 to 1700° C. In the region between the metal surface to be protected and the hot side of the insulating layer a catalyst is provided for reacting carbon monoxide with hydrogen and/or steam.

4 Claims, 1 Drawing Sheet

THERMALLY INSULATED METAL SURFACE PROTECTED AGAINST METAL DUSTING CORROSION

FIELD OF THE INVENTION

This invention relates to a metal surface that is protected against metal-dusting corrosion, which has an insulating layer of a gas-permeable, thermally insulating material as well as to a process for protecting a metal surface that is subject to metal-dusting corrosion. More particularly the invention relates to a metal surface protected against metal-dusting corrosion caused by the decomposition of hot carbon monoxide in contact with said metal surface into elemental carbon and carbon dioxide through the Boudouard reaction which leads to formation of metal carbides and destruction of the metal surface.

BACKGROUND OF THE INVENTION

According to U.S. Pat. No. 5,490,974, metal surfaces can be protected against metal-dusting corrosion by introducing from the outside a largely CO-free, gaseous or vaporous protective medium into a region between the metal surface and the thermal insulating layer.

Metal dusting corrosion occurs under the influence of a hot, CO-containing gas when the gas cools on the metal surface, and the CO is decomposed to form $C+CO_2$ through the Boudouard reaction. Following decomposition of the CO on the metal surface, carbides are formed which lead to the destruction of the structure of the metal itself. Metal-dusting corrosion not only attacks steels, but also attacks nickel-based materials as well.

The intensity of the corrosive attack on the metal surface increases with increasing partial pressure of CO and with an increasing molar ratio between CO and $CO_2$ on the metal surface. The phenomenon of metal-dusting corrosion has not yet been clarified scientifically in all details, but it is known that the potential for the formation of free carbon from the decomposition of CO plays an important role. The decomposition of CO takes place below the Boudouard equilibrium temperature, with this temperature limit being briefly referred to as the Boudouard temperature. The Boudouard temperature increases with increasing partial pressure of CO and with an increasing molar ratio between CO and $CO_2$.

Plants components susceptible to metal-dusting corrosion are, for instance, lines or conduits through which flows synthesis gas, whose main components are CO and $H_2$. Heat exchangers for cooling CO-containing gas, e.g. synthesis gas, must also be considered. The temperature on the metal surfaces susceptible to the metal dusting corrosion usually lie in the range of 300 to 1200° C., and the metal surfaces are exposed to pressures of 1 to 150 bar. The hot gas, which causes the corrosion, mostly has a CO content in the range of 2 to 80 vol-%.

OBJECT OF THE INVENTION

The object of the invention is to protect a metal surface against metal-dusting corrosion in a simple and inexpensive way without supplying a protective gas from the outside.

SUMMARY OF THE INVENTION

According to the invention a metal surface which comes into contact with a hot corrosive CO-containing gas is protected against metal dusting corrosion. The metal surface has a layer of a gas-permeable, thermally insulating material heated by a hot gas stream containing carbon monoxide, which additionally contains hydrogen and/or steam and has a temperature in the range of 300 to 1700° C. The side of the thermally insulating layer that is colder is in contact with the metal surface during passage of the stream of hot CO-containing gas, and the side of the insulating layer that is hotter during passage of the hot CO-containing gas stream is in direct contact with the hot gas stream.

It has been found in accordance with the present invention that the metal surface may be simply and inexpensively protected from metal-dusting corrosion caused by the hot CO-containing gas stream if on the metal surface itself adjacent to the thermally insulating layer or in a region between the metal surface to be protected and the hot side of the thermally insulating layer a catalyst is provided for reacting carbon monoxide with hydrogen and/or steam.

The protection of the metal surface against metal-dusting corrosion is effected by the presence of a catalyst. This catalyst may be disposed on the metal surface itself to be protected, that is adjacent to the gas permeable, thermally insulating layer, in the region between the metal surface and the side of the gas permeable, thermally insulating layer that is hotter during contact of the hot stream of CO-containing gas with the metal surface, or preferably in the region of the cold side of the gas permeable, thermally insulating layer. By means of the catalyst, at least one of the reactions A or B $$CO + 3H_2 \rightarrow CH_4 + H_2O \quad (A)$$

$$CO + H_2O \rightarrow CO_2 + H_2 \quad (B)$$

is promoted. Due to the local reduction of the CO concentration in the vicinity of the metal surface adjacent to the thermally insulating layer and within the thermally insulating layer itself, the Boudouard temperature is reduced, so that the decomposition of CO is wholly or largely prevented.

Even small amounts of catalyst applied to the metal surface itself adjacent to the thermally insulating layer or to the thermally insulating layer may be sufficient for protecting the metal surface, because usually only relatively small amounts of CO must be reacted. Usually the thermal insulation consists of porous insulating concrete, porous bricks or a layer of ceramic fibers as it is well known in the art. Such thermal insulation can easily be provided with the required concentration of catalyst, e.g. through impregnation with a catalyst solution and subsequent drying. It is also possible to admix catalyst to the insulating concrete before the processing, or to the material for manufacturing the bricks.

For promoting at least one of the abovementioned reactions A or B, catalysts known per se may be used. These catalysts usually contain transition elements of the Groups VIII, Ib and IVa of the Periodic Table. In particular one or several of the metals nickel, copper, iron, cobalt, molybdenum, tungsten, chromium, platinum, palladium, rhodium, or ruthenium are suited as catalyst or catalyst components. A preferred concentration of the catalyst is 1 to 200 mg of the metal per $cm^3$ of the thermal insulating layer in the vicinity of the metal surface to be protected. Preferably these metals are provided in the form of an aqueous salt solution such as the nitrate salt. A preferred concentration of the catalyst as an aqueous solution is 1 to 100 mg of the metal per $cm^3$.

Examples of plant components containing metal surfaces that need to be protected from metal-dusting corrosion caused by decomposition of hot CO gas include lines or conduits through which synthesis gas flows, that is any gas where CO and $H_2$ are the main components. Heat exchangers for cooling hot CO-containing gases, e.g. synthesis gas, must also be considered. The temperatures of the metal surfaces susceptible to metal-dusting corrosion usually lie in the range of 300 to 1200° C., and the metal parts are exposed to pressures of 1 to 150 bar. The hot CO-containing gas, which causes the corrosion, usually has a CO content in the range of 2 to 80 vol-%.

An important advantage of the present invention over the invention disclosed in U.S. Pat. No. 5,490,974 is that there is no need in the present invention to introduce a protective gas from the outside into the metal lines or conduits thanks to the addition of the catalyst which converts the CO to other compounds that do not corrode the metal parts.

DETAILED DESCRIPTION OF THE DRAWING

Figure 1:
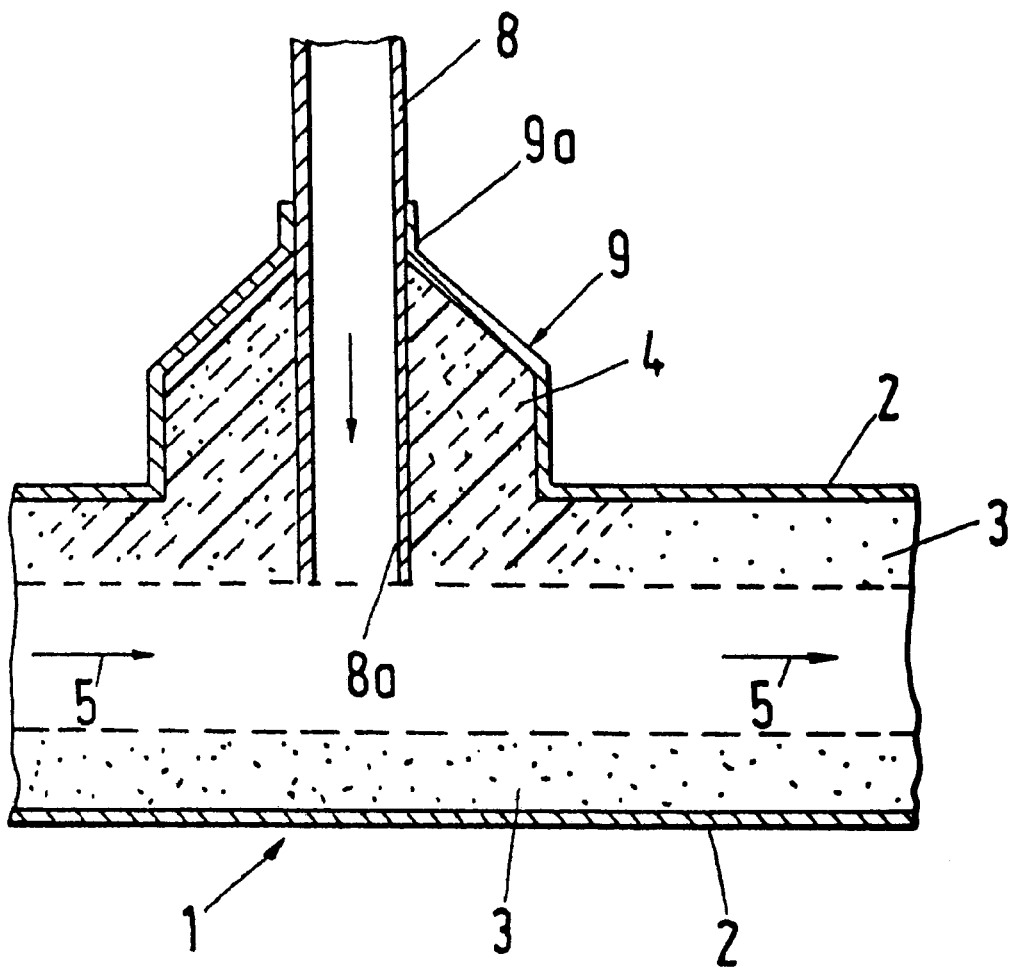
FIG. 1 is a longitudinal cross sectional view through a duct having a metal surface carrying a hot, CO-containing gas.

A collecting line 1 has an outer steel shell 2, which on the inside is lined with a porous, thermal insulating layer 3. In the interior of line 1 a hot, CO-containing gas flows, as is indicated by the arrows 5.

Several individual lines 8, of which only one is represented in the drawing, open into the collecting line 1. The individual lines come, for instance, from a not represented tubular furnace for cracking hydrocarbons, in order to produce a raw synthesis gas having a temperature in the range from e.g. 800 to 1000° C.

In the orifice portion 8a of the individual line 8 the steel sheet 2 has been shaped into a bell 9, whose upper portion 9a is welded with line 8. Between the bell 9 and the outside of line 8 there is likewise provided the porous thermal insulation, which fills this area. Since in particular the inside of the bell 9 is susceptible to metal-dusting corrosion, the insulating material has dispersed therein a catalytically active metal. The region of catalyst-containing thermal insulation is indicated in the drawing by lines 4. As is furthermore shown in the drawing, not the entire thermal insulation is provided with catalyst, but only the susceptible portion inside the bell 9 and the portion directly adjacent thereto. Of course, the thermal insulation is only provided with a catalyst at those regions, of which it is known through calculation or from experience that the metal is attacked by metal dusting corrosion. The type and concentration of the catalyst to be used is best found out by means of experiments. It was found out that the catalyst need only be present in relatively small concentrations in the vicinity of the susceptible points, in order to achieve the required reduction of the CO concentration in the gas present there.

EXAMPLE

In an example an arrangement corresponding to the drawing was examined. The raw synthesis gas supplied through lines 1 and 8 had a temperature of 870° C. and the following composition:

| | |
|---|---|
| $CO_2$ | 5.0 vol - % |
| CO | 9.9 vol - % |
| $H_2$ | 50.1 vol - % |

-continued

| | |
|---|---|
| $CH_4$ | 5.0 vol - % |
| $H_2O$ | 30.0 vol - % |

The insulating layer 3 consisted of porous alumina, and within the area of the bell 9 it had been impregnated with an aqueous nickel nitrate solution and dried afterwards. The concentration of the Ni catalyst was 30 mg Ni per cm³ of insulating layer material. The gas composition directly on the inside of the bell 9 was determined by means of probes, and it was noted that the CO content of the synthesis gas was decreased to a residual content below 1 vol-% corresponding to reactions (A) and (B). At temperatures in this range of 400–600° C. the risk of a metal-dusting corrosion did therefore not exist. Without the catalyst, the CO concentration on the inside of the bell virtually corresponded to the composition of the synthesis gas, so that a Boudouard equilibrium temperature of 785° C. is obtained. In this case, metal-dusting corrosion therefore had to be anticipated.

What is claimed is:

1. A duct transversed by a stream of a corrosive CO-containing gas which comprises:

(a) an outer steel shell;

(b) a porous, gas-permeable thermal insulating layer selected from the group consisting of porous insulating concrete, porous bricks, and a layer of ceramic fibers which lines an inside surface of said outer steel shell, said insulating layer having a first and second side, the first side of the insulating layer facing the steel shell being colder than the second side of said insulating layer in contact with said gas stream when said gas stream transverses said duct; and (c) a catalyst for promoting either reaction of carbon monoxide and molecular hydrogen to form methane and water or reaction of carbon monoxide and water to form carbon dioxide and molecular hydrogen, said catalyst included within said insulating layer or applied to the inside surface of the outer steel shell that is adjacent to the thermal insulating layer, said catalyst containing at least one metal selected from the group consisting of nickel, copper, iron, cobalt, molybdenum, tungsten, chromium, platinum, palladium, rhodium and ruthenium.

2. A process for reducing CO content in a gas stream containing corrosive CO gas through a metal duct to prevent metal dusting corrosion, which comprises the steps of:

(a) guiding the gas stream containing 2 to 80% by volume of carbon monoxide and hydrogen, steam or hydrogen and steam at a temperature in the range of 300 to 1700° C. through a duct, said duct comprising an outer steel shell which is lined on its inside with a porous, gas-permeable thermal insulating layer surrounding said gas stream having first and second sides, the first side of the thermal insulating layer facing the steel shell being colder than the second side of said layer being in contact with said gas stream;

(b) providing a catalyst containing at least one metal selected from the group consisting of nickel, copper, iron, cobalt, molybdenum, tungsten, chromium, platinum, palladium, rhodium and ruthenium, within said gas permeable thermal insulating layer or applied to the inside surface of the outer steel shell that is adjacent to the thermal insulating layer; and (c) catalyzing the reaction of carbon monoxide with hydrogen to form methane and water or the reaction of carbon monoxide and steam to form carbon dioxide and hydrogen in the gas stream to obtain a gas stream with a lower CO content than the CO content in the gas stream employed during step (a).

3. The process for reducing CO content in a gas stream defined in claim 2 wherein the thermal insulating layer consists of porous insulating concrete, porous bricks or a layer of ceramic fibers.

4. The process for reducing CO content in a gas stream defined in claim 2 wherein according to step (b) the catalyst is applied to the inside surface of the outer steel shell that is adjacent to the thermal insulating layer.

* * * * *